(12) United States Patent
Suzuki

(10) Patent No.: US 9,933,303 B2
(45) Date of Patent: Apr. 3, 2018

(54) RADIATION IMAGING APPARATUS

(71) Applicant: CANON KABUSHIKI KAISHA, Tokyo (JP)

(72) Inventor: Masataka Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/959,554

(22) Filed: Dec. 4, 2015

(65) Prior Publication Data

US 2016/0084704 A1 Mar. 24, 2016

Related U.S. Application Data

(63) Continuation of application No. PCT/JP2014/003731, filed on Jul. 15, 2014.

(30) Foreign Application Priority Data

Jul. 24, 2013 (JP) ................................. 2013-153829

(51) Int. Cl.
*G01T 1/00* (2006.01)
*G01J 1/44* (2006.01)
*G01T 1/24* (2006.01)
*G21F 1/00* (2006.01)

(52) U.S. Cl.
CPC ..................... *G01J 1/44* (2013.01); *G01T 1/24* (2013.01); *G21F 1/00* (2013.01)

(58) Field of Classification Search
CPC ... G01T 1/24; G01T 1/243; G01J 1/44; G21F 1/00

USPC ......................................................... 250/394
See application file for complete search history.

(56) References Cited

U.S. PATENT DOCUMENTS

| | | | |
|---|---|---|---|
| 6,075,256 A | 6/2000 | Kaifu et al. | ..................... 257/53 |
| 6,897,449 B1 | 5/2005 | Hata | ........................ 250/370.11 |
| 8,981,309 B2 | 3/2015 | Noguchi et al. | ......... 250/370.08 |

(Continued)

FOREIGN PATENT DOCUMENTS

| | | |
|---|---|---|
| CN | 102511018 | 6/2012 |
| CN | 103126700 | 6/2013 |

(Continued)

OTHER PUBLICATIONS

Office Action dated May 18, 2017 in Chinese (P.R. China) counterpart application 201480040904.5, with translation.

*Primary Examiner* — Taeho Jo

(74) *Attorney, Agent, or Firm* — Fitzpatrick Cella Harper and Scinto

(57) ABSTRACT

A radiation imaging apparatus includes a radiation detection panel configured to detect radiation irradiated by a radiation generation unit, a first member and second member arranged on the incident direction side of the radiation, and a third member and fourth member arranged on a side opposite to the incident direction of the radiation. The second member is arranged between the first member and the radiation detection panel, and the third member is arranged between the radiation detection panel and the fourth member. The second member and the third member are lower in elastic modulus than the first member and the fourth member, and the elastic modulus of the second member is equal to or lower than that of the third member.

14 Claims, 3 Drawing Sheets

(56) References Cited

U.S. PATENT DOCUMENTS

| | | | |
|---|---|---|---|
| 2007/0085015 A1* | 4/2007 | Castleberry | G01T 1/2018 250/370.09 |
| 2008/0078939 A1* | 4/2008 | Hennessy | A61B 6/4233 250/370.09 |
| 2008/0078940 A1* | 4/2008 | Castleberry | G01T 1/2018 250/370.09 |
| 2009/0014659 A1* | 1/2009 | Hennessy | G03B 42/04 250/370.09 |
| 2009/0122959 A1* | 5/2009 | Jadrich | G01T 1/20 378/91 |
| 2010/0177259 A1* | 7/2010 | Ichioka | G02F 1/133308 349/58 |
| 2012/0195409 A1 | 8/2012 | Suwa | 378/189 |
| 2013/0077764 A1* | 3/2013 | Noguchi | G01T 1/20 378/190 |
| 2013/0134319 A1 | 5/2013 | Konkle et al. | 250/394 |
| 2013/0154039 A1* | 6/2013 | Furui | G01T 1/2018 257/428 |
| 2014/0091225 A1* | 4/2014 | Sasaki | G01T 1/202 250/366 |
| 2014/0103216 A1* | 4/2014 | Sasaki | G01T 1/202 250/361 R |
| 2015/0293237 A1 | 10/2015 | Suzuki et al. | G01T 1/2018 |

FOREIGN PATENT DOCUMENTS

| | | |
|---|---|---|
| JP | H11-284909 | 10/1999 |
| JP | 3066944 | 7/2000 |
| JP | 3333278 | 10/2002 |
| JP | 2008-212343 | 9/2008 |
| JP | 2009-020099 | 1/2009 |
| JP | 4208907 | 1/2009 |
| JP | 2011-058999 | 3/2011 |
| JP | 2012-078664 | 4/2012 |
| JP | 2013-072808 | 4/2013 |

\* cited by examiner

RADIATION IMAGING APPARATUS

This application is a continuation of International Patent Application No. PCT/JP2014/003731 filed on Jul. 15, 2014, and claims priority to Japanese Patent Application No. 2013-153829 filed on Jul. 24, 2013, the entire content of both of which is incorporated herein by reference.

TECHNICAL FIELD

The present invention relates to a radiation imaging apparatus.

BACKGROUND ART

Conventionally, an apparatus that irradiates a target object with radiation, detects the intensity distribution of the radiation that has passed through the target object, and obtains the radiation image of the target object has been widely used in the fields of industrial non-destructive inspection and medical diagnosis. Recently, an apparatus that captures a radiation digital image by using a radiation detection panel in which radiation enters a phosphor and light irradiated in response to the radiation is converted into electrical information by a semiconductor sensor, as disclosed in PTL 1, has been developed and can quickly obtain an output image. Especially in recent years, a radiation detection panel in which radiation comes from the semiconductor sensor side, as disclosed in PTL 2, has also been proposed to improve the image quality.

It is assumed that an impact force may occur when the apparatus is dropped or the like, or an external force may be applied to the apparatus when it is used for imaging. Design of the imaging apparatus needs to consider strength, vibration resistance, and shock resistance in order for the apparatus to operate normally and perform its radiation detection function even in such a situation. Particularly, a high pressure is sometimes applied to a housing upper surface serving as the radiation incident surface of the apparatus housing, depending on the method used to capture the radiation image. At this time, the glass substrate constituting the radiation detection panel is highly likely to be broken. If the glass substrate is broken, it becomes very difficult to capture an appropriate radiation image. Thus, satisfactory protection is required to prevent the breakage of the glass substrate. At the same time, the imaging apparatus needs to be reduced in size, thickness, and weight.

To protect the radiation detection panel, various arrangements are sometimes adopted in the radiation imaging apparatus. As in PTL 3, the housing upper surface serving as the radiation incident surface of the housing that stores the radiation detection panel is made of a displaceable material having relatively low rigidity, in order to protect the radiation detection panel. The radiation imaging apparatus sometimes has a structure in which transmission of a shock to the radiation conversion panel is prevented or the shock is moderated by allowing the shock to displace the housing upper surface in a space provided between the housing upper surface and the radiation detection panel.

To protect the radiation detection panel while reducing the thickness of the imaging apparatus, the imaging apparatus may be given a structure in which the radiation detection panel is directly adhered to the housing upper surface serving as a surface on the radiation incident side inside the housing covering the radiation detection panel. The imaging apparatus sometimes has a structure that omits the highly rigid base such as is normally used, supports the radiation detection panel, and is arranged in the housing (PTL 4 or PTL 5). Again, when the radiation detection panel is adhered to the housing upper surface in the same way, the imaging apparatus sometimes may be given a structure in which a member lower in bending rigidity than the housing is used for the base, to protect the radiation detection panel and other members inside the imaging apparatus while reducing the thickness and weight of the overall imaging apparatus (PTL 6).

In addition, the imaging apparatus sometimes is provided with a buffer material that hardly appears as an artifact in a radiation image, arranged between the radiation detection panel and the housing, in order to protect the radiation detection panel from an impact force or the like from the outside of the imaging apparatus (PTL 7).

CITATION LIST

Patent Literature

PTL 1: Japanese Patent No. 3066944
PTL 2: Japanese Patent No. 3333278
PTL 3: Japanese Patent Laid-Open No. 11-284909
PTL 4: US Patent Application Publication No. 2009/0122959
PTL 5: Japanese Patent Laid-Open No. 2012-78664
PTL 6: Japanese Patent Laid-Open No. 2011-58999
PTL 7: Japanese Patent No. 4208907

SUMMARY OF THE INVENTION

Technical Problem

However, the above-described related arts have several problems. First, in PTL 3, the structure is premised on that the housing upper surface is freely displaced, so the imaging apparatus readily becomes thick.

In PTL 4, PTL 5, and PTL 6, necessary rigidity needs to be ensured on the housing upper surface serving as the radiation incident surface of the housing. Radiation irradiated by a radiation generation apparatus transmits an object and the housing upper surface, and is detected by the radiation detection panel. In most cases, the housing upper surface has a simple plate shape with a uniform plate thickness so that the housing upper surface is not left as an artifact in a captured image. It is therefore difficult to increase the rigidity by changing the shape, for example, giving a ribbed structure to the housing upper surface, in order to ensure the necessary rigidity. To ensure the necessary rigidity, the imaging apparatus takes a structure in which the plate thickness is simply increased, and it is difficult to reduce the weight of the imaging apparatus. When the radiation detection panel is bonded to the housing upper surface, if a load such as an external force is applied to the housing, the external force is readily transmitted to the radiation detection panel, increasing the load. Especially in the arrangements in PTL 4, PTL 5, and PTL 6, when an external force is applied, a strong tensile stress is loaded to the radiation detection panel. This tensile stress readily causes breakage of the glass substrate constituting the radiation detection panel. If the glass substrate is broken, it becomes very difficult to capture an appropriate image by the radiation imaging apparatus.

Further, in PTL 7, the buffer material is arranged between the radiation detection panel and the housing upper surface in order to relax an external force or the like applied to an imaging unit. However, only arranging the buffer material does not always implement a structural relationship suited to protection of the radiation detection panel.

In this manner, the radiation imaging apparatus requires weight reduction in order to improve portability and operability. At the same time, it is also important to satisfactorily protect the radiation detection panel from the load of an external force at the time of use and an impact force at the time of a drop or the like.

The present invention has been made in consideration of the above situation, and provides a radiation imaging apparatus capable of reducing the weight while protecting a radiation detection panel and ensuring the rigidity of the radiation imaging apparatus.

Solution to Problem

According to one aspect of the present invention, a radiation imaging apparatus is comprising: a radiation detection panel configured to detect radiation irradiated by a radiation generation unit; a first member and second member arranged on an incident direction side of the radiation; and a third member and fourth member arranged on a side opposite to the incident direction of the radiation, wherein the second member is arranged between the first member and the radiation detection panel, the third member is arranged between the radiation detection panel and the fourth member, the second member and the third member are lower in elastic modulus than the first member and the fourth member, and the elastic modulus of the second member is not higher than the elastic modulus of the third member.

Advantageous Effects of Invention

The present invention can provide a radiation imaging apparatus capable of reducing the weight while protecting a radiation detection panel and ensuring the rigidity of the radiation imaging apparatus.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail with reference to the accompanying drawings. Note that the constituent elements described in the embodiments are merely examples. The technical scope of the present invention is determined by the scope of claims and is not limited by the following individual embodiments.

First Embodiment

Figure 1:
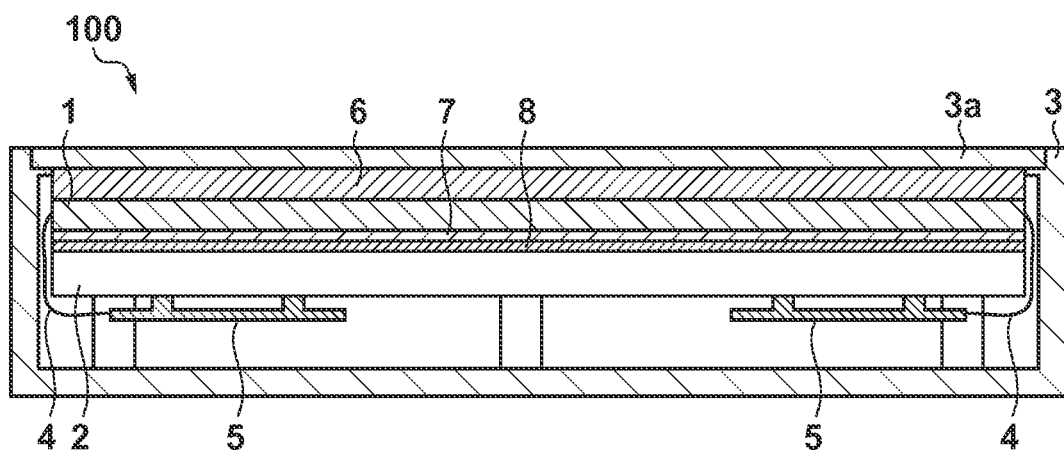
FIG. 1 is a longitudinal sectional view showing a radiation imaging apparatus according to the first embodiment.

The first embodiment will explain an example of an arrangement when a radiation detection panel 1 is not bonded to a housing. FIG. 1 is a sectional view showing an example of the arrangement of a radiation imaging apparatus 100 according to the first embodiment. The radiation imaging apparatus 100 has a structure in which the radiation detection panel 1, and a control board 5 (control unit) for processing data detected by the radiation detection panel 1 are incorporated. Generally in the radiation imaging apparatus 100, radiation that has been irradiated by a radiation generation apparatus (not shown) and has transmitted an object is detected by semiconductor elements arrayed in a two-dimensional matrix. An image obtained by the radiation imaging apparatus 100 is transferred to an external control apparatus (information processing apparatus). The image transferred to the control apparatus is displayed on a monitor and used for diagnosis or the like.

In FIG. 1, the control board 5 is connected to the radiation detection panel 1 by a flexible circuit board 4, and performs readout control of the radiation detection panel 1 and processing of an electrical output. The radiation detection panel 1 and the control board 5 are supported by a base 2 and arranged inside the radiation imaging apparatus 100.

The radiation detection panel 1 is mainly constituted by a glass substrate, a semiconductor element, a phosphor, a phosphor protective film, and the like. The radiation detection panel 1 has a so-called back-side incident arrangement in which the glass substrate, the semiconductor element, the phosphor, and the phosphor protective film are arranged in the order named from the radiation incident direction. Since the emission position of the phosphor and the position of the semiconductor element become close to each other in the back-side incident arrangement, a high-resolution image can be obtained. However, an embodiment that effectively exploits the present invention may adopt a so-called front-side incident arrangement in which the phosphor protective film, the phosphor, the semiconductor element, and the glass substrate are arranged in the order named from the radiation incident direction.

It is assumed that an impact force at the time of a drop or the like, or an external force at the time of imaging is loaded to the radiation imaging apparatus 100. The radiation imaging apparatus 100 needs to consider strength, vibration resistance, and shock resistance in order to normally operate a radiation detection function inside the radiation imaging apparatus 100 even in such a situation.

Since a patient to be imaged or the like contacts the radiation imaging apparatus 100 depending on an imaging method of capturing a radiation image, a high pressure is sometimes applied to a housing upper surface 3a serving as the radiation incident surface of a housing 3 that stores the radiation detection panel 1. If a pressure is applied to the housing upper surface 3a, a distortion by bending is generated in the housing upper surface 3a, generating a bending stress. Similarly, a bending stress is generated even in the glass substrate depending on a structure around the glass substrate. In particular, a locally high stress may be generated at a position, as a center, where the pressure is applied. At this time, the glass substrate constituting the radiation detection panel 1 is highly likely to be broken. If the glass substrate is broken, it becomes very difficult to capture an appropriate radiation image. Thus, satisfactory protection is required to prevent the breakage of the glass substrate. Especially, such a stress generated from a distortion by bending has a property in which a tensile stress is generated on a side opposite to the pressure-applied surface. The tensile stress readily causes breakage of the glass substrate. It is important to relax the tensile stress applied to the glass substrate in order to protect the glass. It is therefore necessary to employ a structure in which, even if a pressure is applied from the housing upper surface, the glass substrate is hardly distorted or the tensile stress is hardly generated. At the same time, the radiation imaging apparatus 100 needs to be reduced in size, thickness, and weight in order to facilitate handling, improve portability, and enable quick imaging.

To achieve this, the inside of the radiation imaging apparatus 100 adopts the following arrangement. The radiation imaging apparatus 100 is constituted by the housing upper surface 3a (first member) serving as the radiation incident surface of the housing, a second constituent member 6 (second member), the radiation detection panel 1, a third constituent member 7 (third member), a radiation shielding member 8, and the base 2 (fourth member) in the order named from the radiation incident direction. Here, the housing upper surface 3a (first member) and the second constituent member 6 (second member) are arranged on the radiation incident direction side with respect to the radiation detection panel 1. The third constituent member 7 (third member), the radiation shielding member 8, and the base 2 (fourth member) are arranged on a side opposite to the radiation incident direction with respect to the radiation detection panel 1. This arrangement can reduce the tensile stress applied to the radiation detection panel 1 owing to a force from the housing upper surface 3a.

The radiation detection panel 1 is lower in rigidity than the housing upper surface 3a (first member) and the base 2 (fourth member). When viewed from the radiation incident direction, an area A1 of each of the housing upper surface 3a and base 2 is equal to an area A2 of the radiation detection panel 1 (A1=A2) or is larger (A1>A2). That is, when viewed from the radiation incident direction, the area A1 of each of the housing upper surface 3a and base 2 is equal to or larger than the area of the radiation detection panel 1 (A1≥A2). With this setting, a shock is hardly transmitted from the housing side to the radiation detection panel 1, and the panel can be held safely. When the area of each of the second constituent member 6 and third constituent member 7 is similarly set to be equal to or larger than the area of the radiation detection panel 1, a shock to the radiation detection panel 1 can be relaxed.

The second constituent member 6 and the third constituent member 7 are lower in the elastic modulus of the material than the housing upper surface 3a, the radiation detection panel 1, and the base 2. The rigidity of the second constituent member 6 is equal to or lower than that of the third constituent member 7. The elastic modulus of the second constituent member 6 is equal to or lower than that of the third constituent member 7. The third constituent member 7 is made of a material whose elastic modulus is equal to or higher than that of the second constituent member 6. That is, the third constituent member 7 and the second constituent member 6 have a constituent relationship in which the elastic modulus of the third constituent member 7 is equal to or higher than that of the second constituent member 6 (the elastic modulus of the third constituent member 7≥the elastic modulus of the second constituent member 6). A member having a low elastic modulus is deformed more readily than a member having a high elastic modulus. The elastic modulus of the second constituent member 6 is equal to or lower than that of the third constituent member 7, so the second constituent member 6 is deformed more readily than the third constituent member 7. Alternatively, the second constituent member 6 is readily deformed equally to the third constituent member 7. The deformation of the housing upper surface 3a or the like by an externally applied load is absorbed by the deformation of the second constituent member 6. As a result, the influence of the deformation on the radiation detection panel 1 can be prevented to protect the radiation detection panel 1.

In order to absorb the deformation of the housing upper surface 3a or the like by an externally applied load, the plate thickness of the second constituent member 6 is set to be equal to or larger than that of the third constituent member 7. The elastic modulus of the second constituent member 6 is equal to or lower than that of the third constituent member 7. The second constituent member 6 and the third constituent member 7 are made of buffer materials. As the second constituent member 6, for example, an elastic material such as rubber, foam, elastomer, or gel can be used. As the third constituent member 7, an elastic material such as rubber, foam, elastomer, or gel can be used as in the second constituent member 6, but the material is not limited to them as long as the material can satisfy the above-mentioned relationship. The housing upper surface 3a can use carbon fiber reinforced plastic (CFRP) or the like in terms of the relationship between sufficient rigidity and the transmittance of radiation. Since the base 2 needs to give sufficient rigidity, it is a highly rigid structure made of a fiber reinforced plastic such as CFRP, a magnesium alloy, or an aluminum alloy, and has a rigidity higher than that of the housing upper surface 3a.

The second constituent member 6 and third constituent member 7 made of materials lower in elastic modulus than the housing upper surface 3a and the like are expected to have an effect of absorbing a shock, a deformation, and the like from the housing upper surface 3a and the like. As described above, when an external force from the upper surface side is applied, the second constituent member 6 is distorted more readily than the third constituent member 7, and the radiation detection panel 1 is hardly distorted. Since generation of a tensile stress by the distortion can be relaxed for the radiation detection panel 1, a high protection effect can be expected. Since the breakage of the radiation detection panel 1 can be prevented, the rigidity necessary for the radiation imaging apparatus 100 can be decreased to reduce the weight and thickness of the radiation imaging apparatus 100.

A case is as follows, in which the above-described constituent relationship (the elastic modulus of the third constituent member 7≥the elastic modulus of the second constituent member 6) is changed to take a relationship in which the third constituent member 7 is distorted more readily than the second constituent member 6 (the elastic modulus of the second constituent member 6>the elastic modulus of the third constituent member 7). In this case, the function of relaxing an external force for the radiation detection panel 1 acts, but the radiation detection panel 1 readily follows the distortion or displacement of the third constituent member 7, so a load is readily applied to the radiation detection panel 1.

The radiation shielding member 8 is arranged between the base 2 and the third constituent member 7. Radiation entering the radiation imaging apparatus 100 is not completely absorbed by the phosphor constituting the radiation detection panel 1, and part of it transmits the inside of the radiation imaging apparatus 100 and emerges from the radiation imaging apparatus 100. The radiation having transmitted the radiation imaging apparatus 100 is sometimes scattered by the back wall surface, the floor, or the like, returns to the radiation imaging apparatus 100, and enters the radiation detection panel 1. The difference in the transmittance of such scattered radiation depending on the structure is captured as an image, so the scattered radiation needs to be suppressed as much as possible. The radiation shielding member 8 can be constituted using, for example, a material consisting of at least one heavy metal selected from the group consisting of lead (Pb), barium (Ba), tantalum (Ta), molybdenum (Mo), and tungsten (W), or stainless steel.

According to the first embodiment, the radiation detection panel 1 can be protected from a shock and deformation caused by an external force as long as the constituent relationship (mechanical relationship) between the members around the radiation detection panel 1 is satisfied. Thus, highly rigid structures need not always be the housing upper surface 3a and the base 2. According to the first embodiment, the arrangement in which the load on the glass can be reduced in comparison with the related art can be employed, so the weight and thickness of the radiation imaging apparatus 100 can be reduced.

Second Embodiment

Figure 2:
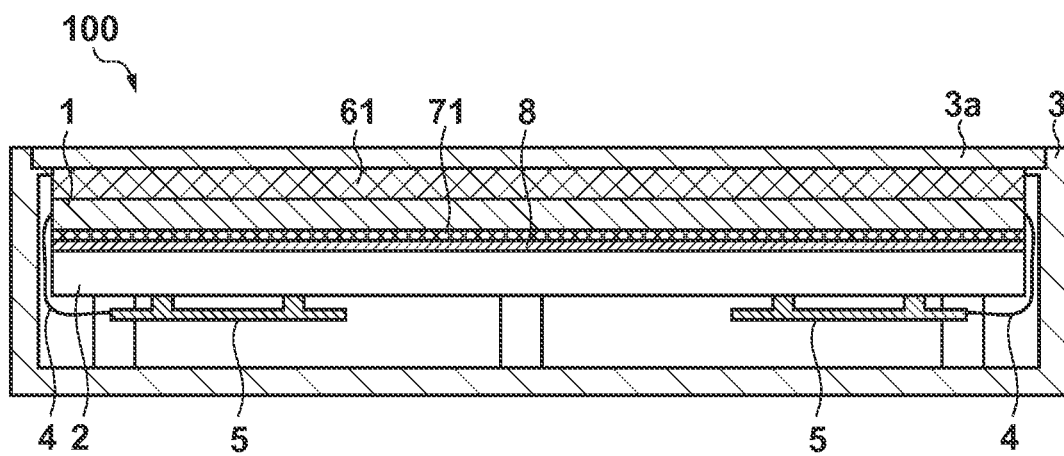
FIG. 2 is a longitudinal sectional view showing a radiation imaging apparatus according to the second embodiment.

The second embodiment will explain an example of an arrangement when a radiation detection panel 1 is bonded to a housing. FIG. 2 is a sectional view showing an example of the arrangement of a radiation imaging apparatus 100 according to the second embodiment. As in the first embodiment, the radiation detection panel 1 is supported by a base 2. A control board 5 that performs readout control of the radiation detection panel 1 and processing of an electrical output is connected to the radiation detection panel 1 by a flexible circuit board 4. Also, as in the first embodiment, the radiation detection panel 1 may take the front-side incident arrangement or the back-side incident arrangement.

To achieve both weight reduction of the radiation imaging apparatus 100 and satisfactory protection of the radiation detection panel 1, the radiation imaging apparatus 100 adopts an arrangement in which the radiation detection panel 1, and a housing upper surface 3a serving as the radiation incident surface of a housing 3 covering the radiation detection panel 1 are bonded. Bonding increases the rigidity of the radiation imaging apparatus 100, and an arrangement in which the base 2 supporting the radiation detection panel 1 is omitted is taken in some cases. Omitting the base 2 can implement an arrangement in which the space where the control board 5 is arranged is widened, and the weight can be reduced.

However, it is assumed that a heavy load is applied to the housing upper surface 3a of the radiation imaging apparatus 100 depending on the imaging method. When the base 2 is omitted, if an external force is applied to the housing upper surface 3a, a strong tensile stress is loaded to the radiation detection panel 1 owing to the relationship between the layered structure and the neutral axis of the bending stress. This tensile stress readily causes breakage of a glass substrate constituting the radiation detection panel 1.

A strong tensile stress may be loaded to the radiation detection panel 1 unless the radiation detection panel 1 is arranged under a suitable structural relationship. This structure makes it difficult to protect the radiation detection panel 1.

As described above, in the bonding structure in which the radiation detection panel 1 is bonded to the housing upper surface 3a, the housing upper surface 3a or the like needs to maintain high rigidity in order to maintain the rigidity necessary for the whole structure. Radiation irradiated by a radiation generation apparatus is detected by the radiation detection panel 1 after transmitting an object and the housing upper surface 3a. In most cases, the housing upper surface 3a has a simple plate shape with a uniform plate thickness so that the housing upper surface 3a is not left as an artifact in a captured image. It is therefore difficult to change the shape, for example, give a ribbed structure, in order to ensure the necessary rigidity. The rigidity is increased by simply increasing the plate thickness or the like, inhibiting weight reduction. When the radiation detection panel 1 is bonded to the housing upper surface 3a and integrated with it, if a load such as an external force is applied to the housing, the external force is readily transmitted to the radiation detection panel 1, and the load on the radiation detection panel 1 may increase.

In this embodiment, an arrangement as shown in FIG. 2 is adopted around the radiation detection panel 1 in order to increase the rigidity by integrating the radiation detection panel 1 and a highly rigid member while avoiding the above-described influence.

In FIG. 2, the radiation detection panel 1 is integrated with members including the housing upper surface 3a serving as the radiation incident surface of the housing 3, a second constituent member 61, a third constituent member 71, and the base 2. At this time, members lower in rigidity (elastic modulus) than the housing upper surface 3a, the radiation detection panel 1, and the base 2 are used for the second constituent member 61 arranged between the housing upper surface 3a and the radiation detection panel 1, and the third constituent member 71 arranged between the radiation detection panel 1 and the base 2.

The third constituent member 71 is made of a material whose elastic modulus is equal to or higher than that of the second constituent member 61. The elastic modulus of the second constituent member 61 is equal to or lower than that of the third constituent member 71. The plate thickness of the second constituent member 61 is equal to or larger than that of the third constituent member 71. The thickness of the third constituent member 71 is set to be smaller than that of the second constituent member 61.

These members are bonded and integrated. This can achieve the buffer effect against an external force, and an increase in rigidity by integration. The rigidity of the base 2 is higher than that of the housing upper surface 3a.

The second constituent member 61 arranged between the housing upper surface 3a and the radiation detection panel 1 can be constituted by a member in which a double-faced tape or adhesive is arranged on the two surfaces of an elastic material such as rubber, foam, elastomer, or gel so as to be able to integrate the second constituent member 61 with the housing upper surface 3a and the radiation detection panel 1. Further, the third constituent member 71 arranged between the radiation detection panel 1 and the base 2 supporting the radiation detection panel 1 can be constituted by an elastic material such as rubber, foam, elastomer, or gel, as in the second constituent member 61, or a member such as a double-faced tape or an adhesive. The third constituent member 71 suffices to be, for example, a material that satisfies the above-mentioned mechanical relationship.

The housing upper surface 3a can also use CFRP or the like in terms of the relationship between sufficient rigidity and the transmittance of radiation. Since the base 2 needs to give sufficient rigidity, it is a highly rigid structure made of carbon fiber reinforced plastic such as CFRP, a magnesium alloy, or an aluminum alloy, and has a rigidity higher than that of the housing upper surface 3a.

By this arrangement, the radiation detection panel 1 is integrated with the housing upper surface 3a and the base 2. The present inventor has found that, when an external force is applied from the radiation incident direction to the housing upper surface 3a with respect to the glass substrate constituting the radiation detection panel 1, this arrangement easily relaxes a tensile stress that readily causes breakage of the glass.

Figure 3:
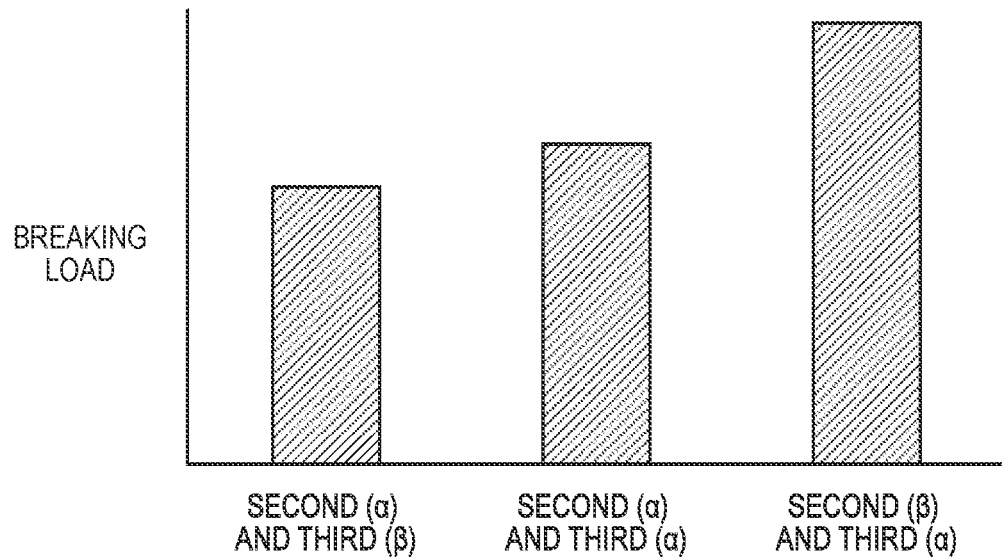
FIG. 3 is a graph showing the breaking load of a radiation detection panel 1 depending on the difference of the arrangement.
Figure 4:
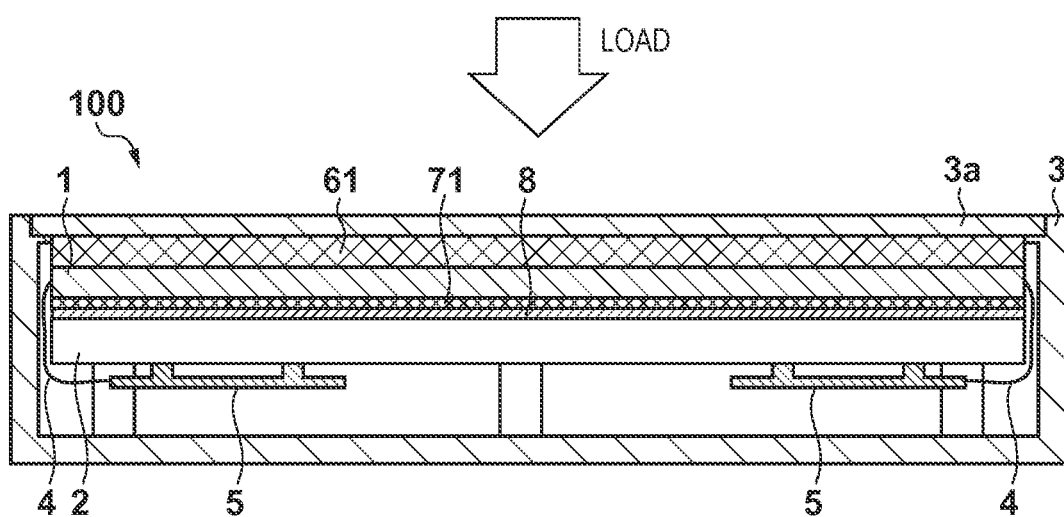
FIG. 4 is a view showing a state in which a load is loaded to the radiation detection panel 1.

FIG. 3 is a graph showing the relationship of average external forces by which the radiation detection panel 1 is broken when a load is applied to the radiation detection panel 1 owing to the difference in thickness between the second constituent member 61 and the third constituent member 71. Only the thicknesses of the second constituent member 61 and third constituent member 71 are changed without changing conditions for the housing upper surface 3a, the base 2, and the radiation detection panel 1. The second constituent member 61 and the third constituent member 71 use the same material. As the load direction, a load is applied from the radiation incident direction, as shown in FIG. 4. This is because a heavy load is readily applied from the radiation incident direction to the radiation imaging apparatus 100 depending on the imaging method. In FIG. 3, $\alpha$ and $\beta$ represent the thicknesses of the two members, respectively, and have a relation of $\alpha<\beta$. The second constituent member 61 having the thickness $\alpha$ is represented by the second ($\alpha$), and the second constituent member 61 having the thickness $\beta$ is represented by the second ($\beta$). Similarly, the third constituent member 71 having the thickness $\alpha$ is represented by the third ($\alpha$), and the third constituent member 71 having the thickness $\beta$ is represented by the third ($\beta$). As is apparent from FIG. 3, the breaking load of the radiation detection panel 1 changes by only changing the thicknesses of the second constituent member 61 and third constituent member 71. In particular, it is found that the breaking load greatly rises when the second constituent member 61 is made thick and the third constituent member 71 is made thin (second ($\beta$) and third ($\alpha$)).

Figure 5:
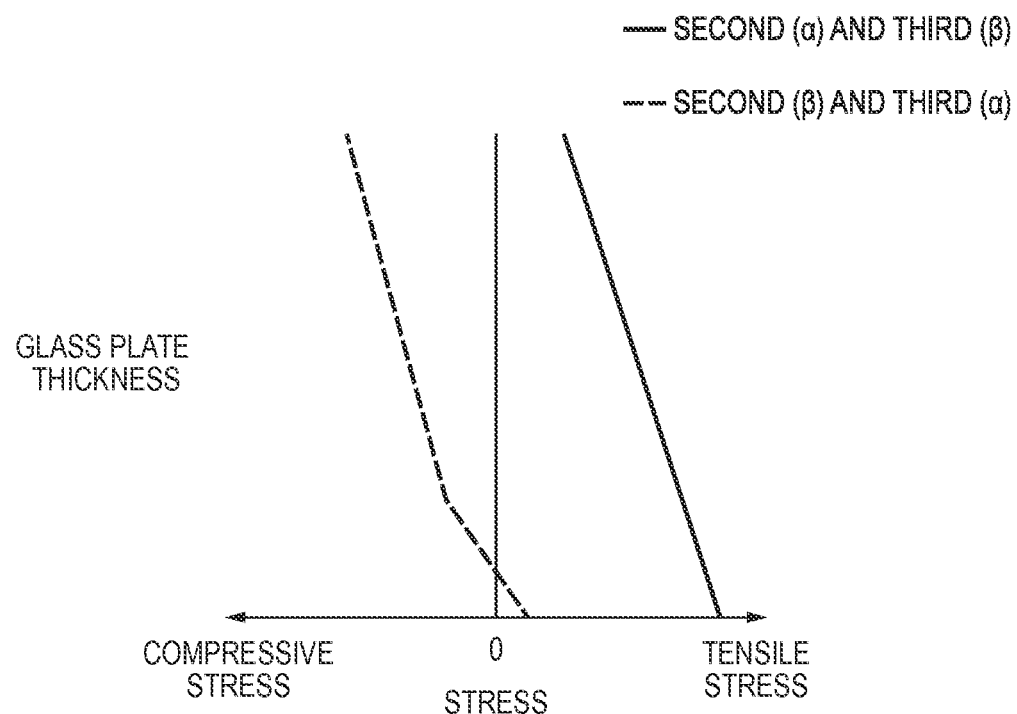
FIG. 5 is a graph showing the state of the load of a stress on a glass member constituting the radiation detection panel 1 depending on the difference of the arrangement.

FIG. 5 is a graph showing the relationship between the stress and the plate thickness of the glass member constituting the radiation detection panel 1, which was obtained by analysis when a predetermined load was applied in the same arrangement as that in the experiment of FIG. 3. As combinations having a large difference in breaking load in FIG. 3, a combination of (second ($\alpha$) and third ($\beta$)) is indicated by a solid line, and a combination of (second ($\beta$) and third ($\alpha$)) is indicated by a broken line.

In FIG. 5, the ordinate indicates the plate thickness of the glass member, and the abscissa indicates the stress applied to the glass member. The right side along the abscissa indicates a tensile stress, and the left side indicates a compressive stress. As is apparent from FIG. 5, a high tensile stress is loaded to the entire glass member in the arrangement of (second ($\alpha$) and third ($\beta$)) indicated by the solid line. The tensile stress readily causes breakage of the glass member. In the combination of (second ($\beta$) and third ($\alpha$)) indicated by the broken line, the tensile stress shifts in the compression direction as a whole. This analysis result reveals that the state of the stress applied to the glass member greatly changes depending on the mechanical relationship around the radiation detection panel.

Similarly, the present inventor has found that the mechanical characteristic for protecting the radiation detection panel 1 changes depending on even the relationship in elastic modulus and rigidity between the second constituent member 61 and the third constituent member 71, and the relationship in rigidity between the housing upper surface 3a and the base 2.

In this embodiment, the radiation detection panel 1 is integrated with members including the housing upper surface 3a serving as the radiation incident surface of the housing 3, the second constituent member 61, the third constituent member 71, and the base 2. At this time, the rigidity of the integrated structure of the housing upper surface 3a and second constituent member 61 arranged in the radiation incident direction is lower than the rigidity of the integrated structure of the third constituent member 71 and base 2 arranged on a side opposite to the radiation incident direction.

According to the second embodiment, a load that causes breakage of the radiation detection panel 1 can be reduced, the rigidity necessary for the radiation imaging apparatus can be decreased, and the weight and thickness of the radiation imaging apparatus can thus be reduced.

As in the first embodiment, a radiation shielding member 8 is arranged between the base 2 and the third constituent member 71. The radiation shielding member can be constituted using, for example, a material containing at least one heavy metal selected from the group consisting of lead (Pb), barium (Ba), tantalum (Ta), molybdenum (Mo), and tungsten (W), or stainless steel.

According to the second embodiment, the radiation detection panel 1 can be protected from a shock and deformation caused by an external force as long as the constituent relationship (mechanical relationship) between the members around the radiation detection panel 1 is satisfied. That is, according to the second embodiment, the arrangement in which the load on the glass can be reduced in comparison with the related art can be employed, so the weight and thickness of the radiation imaging apparatus 100 can be reduced.

Third Embodiment

Figure 6:
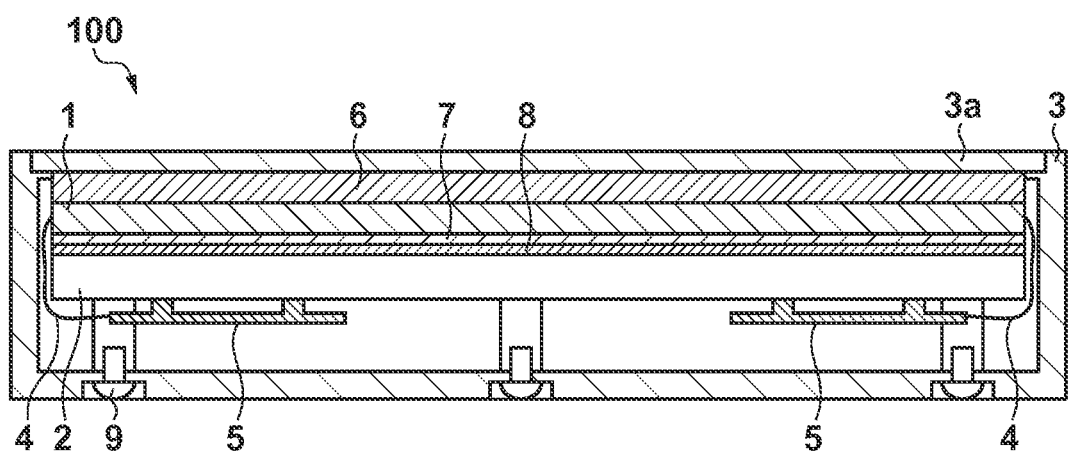
FIG. 6 is a longitudinal sectional view showing a radiation imaging apparatus according to the third embodiment.

The third embodiment will explain an example of an arrangement in which a base 2 is fastened to a housing 3. FIG. 6 is a sectional view showing an example of the arrangement of a radiation imaging apparatus 100 according to the third embodiment. As in the first and second embodiments, a radiation detection panel 1 is supported by the base 2. A control board 5 that performs readout control of the radiation detection panel 1 and processing of an electrical output is connected to the radiation detection panel 1 by a flexible circuit board 4. As in the first and second embodiments, the radiation detection panel 1 may take the so-called front-side incident arrangement or back-side incident arrangement.

As in the first and second embodiments, the inside of the radiation imaging apparatus 100 adopts the following arrangement in order to protect the radiation detection panel 1. The radiation imaging apparatus 100 is constituted by a housing upper surface 3a serving as the radiation incident surface of the housing, a second constituent member 6, the radiation detection panel 1, a third constituent member 7, a radiation shielding member 8, and the base 2 in the order named from the radiation incident direction.

The second constituent member 6 and the third constituent member 7 are lower in the elastic modulus of the material than the housing upper surface 3a, the radiation detection panel 1, and the base 2. The rigidity of the second constituent member 6 is equal to or lower than that of the third constituent member 7. The elastic modulus of the second constituent member 6 is equal to or lower than that of the third constituent member 7. The third constituent member 7 is made of a material whose elastic modulus is equal to or higher than that of the second constituent member 6. That is, the third constituent member 7 and the second constituent member 6 have a constituent relationship in which the elastic modulus of the third constituent member 7 is equal to or higher than that of the second constituent member 6 (the elastic modulus of the third constituent member 7≥the elastic modulus of the second constituent member 6). The elastic modulus of the second constituent member 6 is equal to or lower than that of the third constituent member 7, so the second constituent member 6 is deformed more readily than the third constituent member 7. Alternatively, the second constituent member 6 is readily deformed equally to the third constituent member 7. A local deformation of the housing upper surface 3a or the like by an externally applied load is absorbed by the deformation of the second constituent member 6. As a result, the influence of the local deformation on the radiation detection panel 1 can be prevented to protect the radiation detection panel 1.

In order to absorb the local deformation of the housing upper surface 3a or the like by an externally applied load, the plate thickness of the second constituent member 6 is set to be equal to or larger than that of the third constituent member 7. The elastic modulus of the second constituent member 6 is equal to or lower than that of the third constituent member 7. The second constituent member 6 and the third constituent member 7 are made of buffer materials. As the second constituent member 6, for example, an elastic material such as rubber, foam, elastomer, or gel can be used. As the third constituent member 7, an elastic material such as rubber, foam, elastomer, or gel can be used as in the second constituent member 6, but the material is not limited to them as long as the material can satisfy the above-mentioned relationship. The housing upper surface 3a can use CFRP or the like in terms of the relationship between sufficient rigidity and the transmittance of radiation. Since the base 2 needs to give sufficient rigidity, it is a highly rigid structure made of a fiber reinforced plastic such as CFRP, a magnesium alloy, or an aluminum alloy, and has a rigidity higher than that of the housing upper surface 3a.

However, these members may be bonded and integrated, as in the second embodiment, or may not be bonded, as in the first embodiment. Alternatively, some constituent members described above may be bonded.

In FIG. 6, the base 2 is fastened to the housing 3 by a fastening member 9 (for example, a bolt, screw, or pin) in order to increase the rigidity of the base 2 supporting the radiation detection panel 1. Since the housing 3 and the base 2 are integrated, the rigidity of the radiation imaging apparatus 100 can be increased. Since the integration of the housing 3 and base 2 increases the rigidity, rigidities necessary for the remaining constituent elements can be decreased. The weight and thickness of the radiation imaging apparatus 100 can therefore be reduced.

According to the third embodiment, the radiation detection panel 1 can be protected from a shock and deformation caused by an external force as long as the constituent relationship (mechanical relationship) between the members around the radiation detection panel 1 is satisfied. Hence, highly rigid structures need not always be the housing upper surface 3a and the base 2. According to the third embodiment, the arrangement in which the load on the glass can be reduced in comparison with the related art can be employed, so the weight and thickness of the radiation imaging apparatus 100 can be reduced.

Each of the above-described embodiments can provide a radiation imaging apparatus capable of reducing the weight and thickness while protecting a radiation detection panel and ensuring the rigidity necessary for the radiation imaging apparatus.

The present invention is not limited to the above-described embodiments, and various changes and modifications can be made within the spirit and scope of the present invention. Therefore, to apprise the public of the scope of the present invention, the following claims are made.

What is claimed is:

1. A radiation imaging apparatus comprising:
   a radiation detection panel configured to detect radiation irradiated by a radiation generation unit;
   a first member and second member arranged on a radiation-incident direction side;
   a third member and fourth member arranged on a side opposite to the radiation-incident direction side; and
   a housing containing the radiation detection panel and at least the fourth member,
   wherein the fourth member is configured as a base which supports the radiation detection panel, and
   wherein the second member is arranged between the first member and the radiation detection panel,
   the third member is arranged between the radiation detection panel and the fourth member and in contact with the radiation detection panel,
   the second member and the third member are lower in elastic modulus than the first member and the fourth member, and
   the elastic modulus of the second member is lower than the elastic modulus of the third member.

2. The radiation imaging apparatus according to claim 1, wherein a plate thickness of the second member is not smaller than a plate thickness of the third member.

3. The radiation imaging apparatus according to claim 1, wherein a rigidity of the second member is lower than a rigidity of the third member.

4. The radiation imaging apparatus according to claim 1, wherein the fourth member has a rigidity higher than the rigidity of the first member.

5. The radiation imaging apparatus according to claim 1, wherein a rigidity of the radiation detection panel is lower than the rigidity of the first member and the rigidity of the fourth member.

6. The radiation imaging apparatus according to claim 1, wherein an area of each of the first member and the fourth member is not smaller than an area of the radiation detection panel when viewed from the radiation-incident direction.

7. The radiation imaging apparatus according to claim 1, wherein the radiation detection panel is constituted by integrating at least the first member, the second member, the third member, and the fourth member with the radiation detection panel.

8. The radiation imaging apparatus according to claim 1, wherein a rigidity of an integrated structure of the first member and second member arranged in the incident direction of the radiation is lower than a rigidity of an integrated structure of the third member and fourth member arranged on the side opposite to the incident direction of the radiation.

9. The radiation imaging apparatus according to claim 1, wherein the first member is part of the housing.

10. The radiation imaging apparatus according to claim 1, wherein the fourth member is a member supporting a control unit configured to process data detected by the radiation detection panel.

11. The radiation imaging apparatus according to claim 1, wherein a radiation shielding member is arranged between the fourth member and the third member.

12. The radiation imaging apparatus according to claim 11, wherein the radiation shielding member is constituted using a material containing at least one heavy metal selected from the group consisting of lead (Pb), barium (Ba), tantalum (Ta), molybdenum (Mo), and tungsten (W), or stainless steel.

13. The radiation imaging apparatus according to claim 1, wherein the second member and the third member are constituted by buffer materials.

14. The radiation imaging apparatus according to claim 1, wherein the fourth member is fastened to the housing.

* * * * *